United States Patent [19]

Baur

[11] Patent Number: 5,568,304

[45] Date of Patent: Oct. 22, 1996

[54] OPTICAL RECEIVER FOR MODULATED LIGHT

[75] Inventor: Peter F. Baur, Augsburg, Germany

[73] Assignee: AT&T Global Information Solutions Company, Dayton, Ohio

[21] Appl. No.: 468,599

[22] Filed: Jun. 6, 1995

[30] Foreign Application Priority Data

Dec. 5, 1994 [GB] United Kingdom ............ 9424523

[51] Int. Cl.⁶ .................................................. H04B 10/06
[52] U.S. Cl. ..................... 359/189; 357/172; 250/361 R; 250/368
[58] Field of Search ............................ 359/189, 193, 359/172; 250/361 R, 362, 368, 47.1, 227.31

[56] References Cited

U.S. PATENT DOCUMENTS

| | | | |
|---|---|---|---|
| 4,088,508 | 5/1978 | Gravisse | 250/211 |
| 4,236,791 | 12/1980 | Krüeger et al. | 250/227.31 |
| 4,298,802 | 11/1981 | Quella et al. | 359/896 |
| 4,367,367 | 1/1983 | Reisfeld | 136/247 |
| 4,371,897 | 2/1983 | Kramer | 250/368 |
| 4,506,153 | 3/1985 | Ohno | 250/227 |
| 4,661,649 | 4/1987 | Reisfeld et al. | 250/486.1 |
| 4,746,179 | 5/1988 | Dahne et al. | 385/12 |
| 4,763,133 | 8/1988 | Takemura et al. | 343/912 |
| 4,764,984 | 8/1988 | Franke et al. | 359/172 |
| 4,851,855 | 7/1989 | Tsukamoto et al. | 343/700 MS |
| 4,866,406 | 9/1989 | Minakata et al. | 359/315 |
| 4,884,860 | 12/1989 | Brown | 385/12 |
| 5,132,530 | 7/1992 | Groh et al. | 250/227.31 |
| 5,162,810 | 11/1992 | Onisawa et al. | 343/912 |

OTHER PUBLICATIONS

Technical Information, Color Lumogen® F Collector dyes BASF.

Primary Examiner—Wellington Chin
Assistant Examiner—Rafael Bacares
Attorney, Agent, or Firm—Albert L. Sessler, Jr.

[57] ABSTRACT

An optical receiver for modulated light includes an optical antenna (12) having fluorescent material (18) dispersed therein, and an optoelectrical demodulator (14) for demodulating the modulated light. The optical antenna (12) is formed of a filter material which is transparent to wavelengths equal to or longer than a predetermined wavelength and absorptive to wavelengths shorter than the predetermined wavelength. Also, the optical antenna (12) has a coating (20) of a filter material which is transparent to wavelengths equal to or shorter than the predetermined wavelength, and reflective to wavelengths longer than the predetermined wavelength. Thus, the optical antenna (12) acts on a narrow-pass band filter. Since the fluorescent material emits light at a longer wavelength than the received light, the emitted light is reflected internally to impact on the optoelectrical demodulator (14).

12 Claims, 3 Drawing Sheets

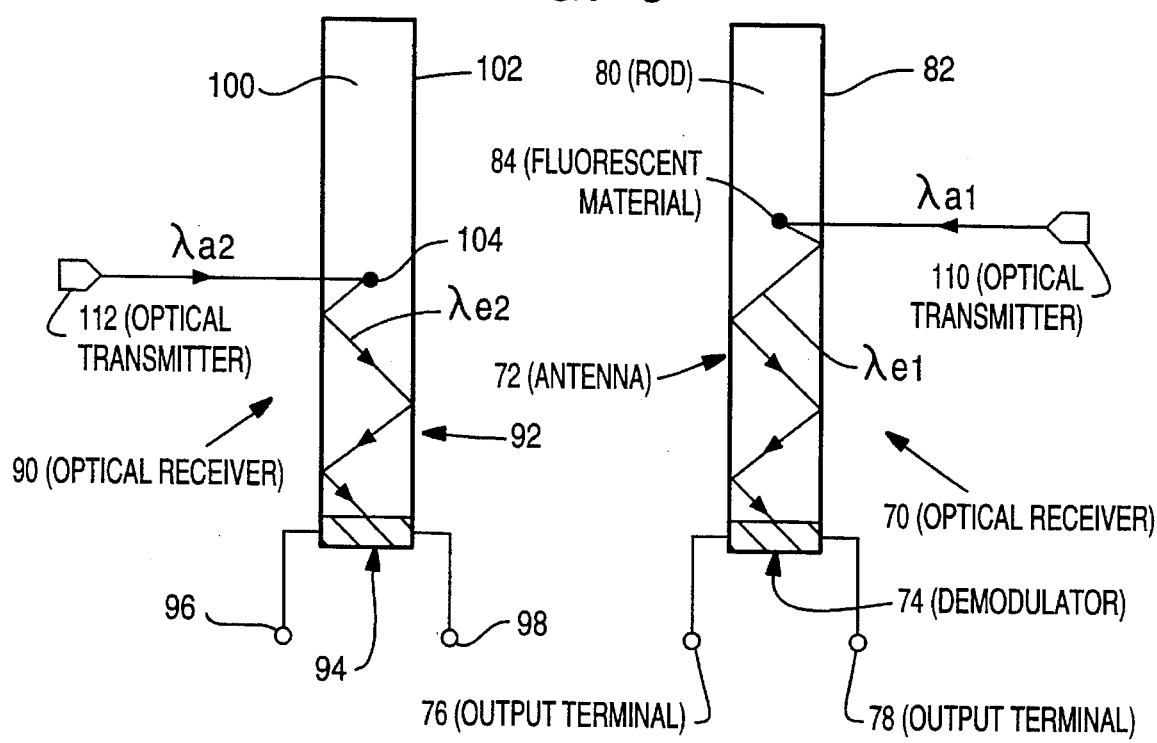
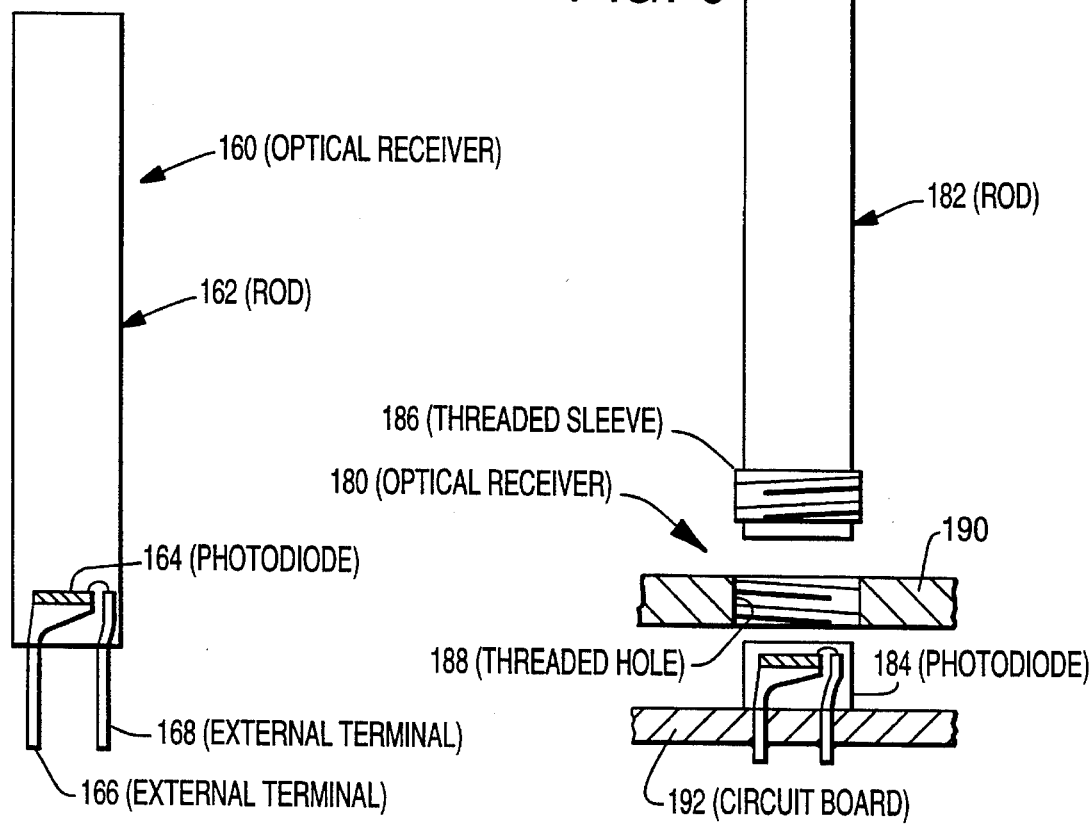

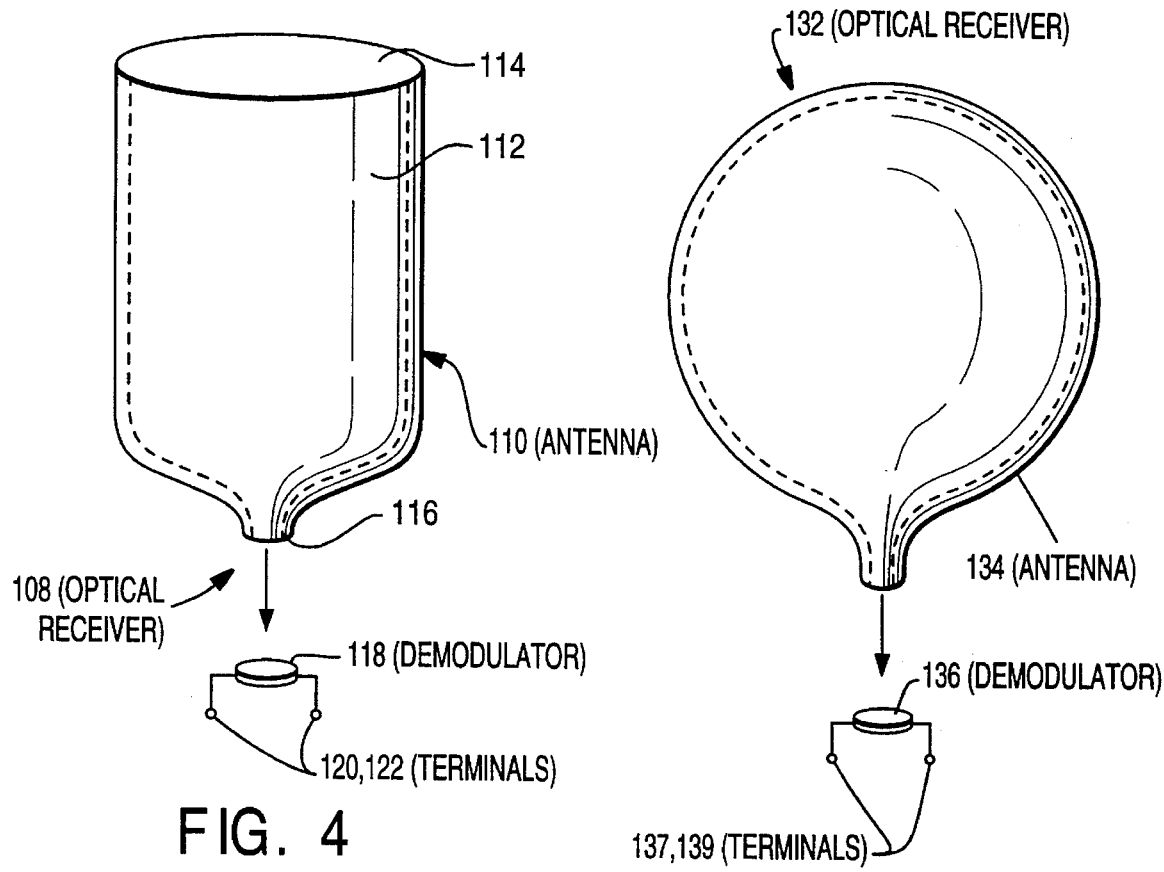
FIG. 4
FIG. 5
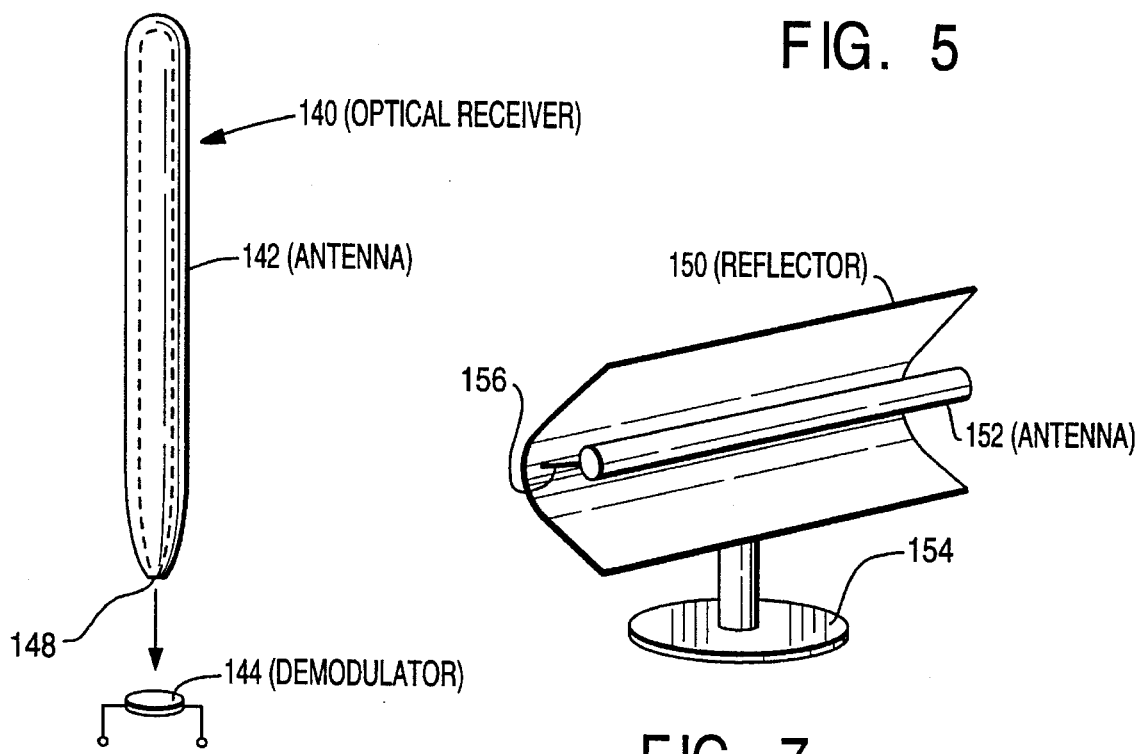
FIG. 6
FIG. 7

OPTICAL RECEIVER FOR MODULATED LIGHT

BACKGROUND OF THE INVENTION

This invention relates to optical receivers for light modulated for data transmission.

Currently there are two ways commonly employed for utilizing light as a carrier for data transmission. For long distances, glass fiber conductors are being used, for example in a fiber distributed digital interface (FDDI) system. For short distances, light radiation is transmitted by a transmitter, and detected by a photosensitive component such as a photodiode. With this arrangement, only a very small portion of the radiated light energy reaches the photosensitive component. To alleviate this problem, the light transmitter may be relatively strong or the light could be focused on the receiver.

U.S. Pat. No. 4,764,984 discloses an optical receiver which effects an alternative way of alleviating the above problem. This known optical receiver, adapted for detecting a time modulated infrared light signal of a preselected wavelength includes a light collecting member made of a transparent core material, containing a fluorescent light absorbing dye molecularly dispersed in the core. A filter is provided for passing light of the preselected wavelength to the light collecting member. A photodiode sensor is operatively associated with the light collecting member for detecting fluorescent light emitted by the collecting member upon exposure to infrared radiation of the preselected wavelength. Since the light collecting member has a surface area much greater than the surface area of the photodiode sensor, a high gain is achieved. However, this known device has the disadvantage of being of cumbersome construction, resulting from the use of a separate filter in association with the light collecting member.

SUMMARY OF THE INVENTION

According to the present invention there is provided an optical receiver for modulated light, including an optical antenna for collecting transmitted modulated light and having a fluorescent material dispersed therein; and an optoelectrical demodulator located in operative relationship to said optical antenna and adapted to convert light emitted by said fluorescent material to electrical signals, characterized in that said optical antenna is formed of a lowpass filter material which is transparent to wavelengths equal to or longer than a predetermined wavelength and absorptive to wavelengths shorter than said predetermined wavelength, and in that said optical antenna is provided with a coating of high-pass filter material which is transparent to wavelengths equal to or shorter than said predetermined wavelength, and is reflective to wavelengths longer than said predetermined wavelength.

It is an object of the present invention to provide a high gain optical receiver for modulated light which is of simple and inexpensive construction.

BRIEF DESCRIPTION OF THE DRAWINGS

Embodiments of the invention will now be described by way of example, with reference to the accompanying drawings, in which:

FIG. 3 is a diagram showing optical signals directed to two different rod-type optical antennas from two different transmitters, with each transmitter transmitting light of a different frequency;

FIGS. 4, 5 and 6 show three different configurations of tubular thin-walled antennas, each coupled to an associated optoelectrical demodulator to form a light receiver;

FIG. 7 shows a rod or tubular antenna in combination with a reflector which serves to concentrate light which is applied to the antenna;

FIG. 8 shows one implementation of an optical receiver according to the invention; and FIG. 9 shows another implementation of an optical receiver according to the invention.

DETAILED DESCRIPTION

Figure 1:
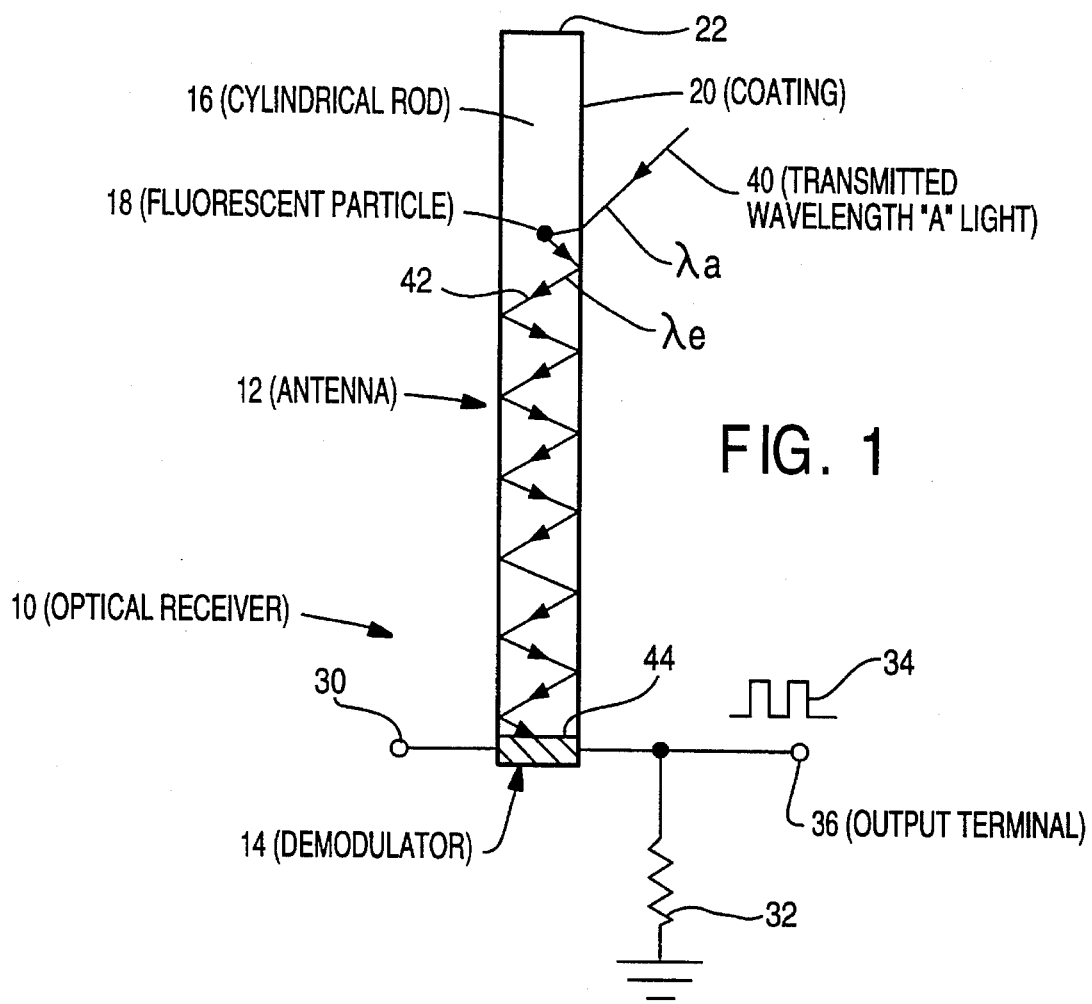
FIG. 1 is a diagrammatic view of an optical receiver including a rod-shaped optical antenna and an associated optoelectrical demodulator.

Referring first to FIG. 1, there is shown an optical receiver 10 for receiving optical signals modulated by data signals. The optical receiver 10 includes an optical antenna 12 and an optoelectrical demodulator 14. The optical antenna 12 includes a cylindrical rod 16 which is formed of low-pass filter material, that is, a material which passes light having a frequency equal to, or lower than, a predetermined frequency, and absorbs light having a frequency higher than the predetermined frequency. In other words, the material of the rod 16 is transparent to light having wavelengths equal to or longer than a predetermined wavelength, and blocks (absorbs) light having a wavelength shorter than the predetermined wavelength.

The rod 16 has dispersed therein particles 18 of a fluorescent material. Preferably the fluorescent material is molecularly dispersed in the rod 16. Suitable fluorescent materials include rotamine-B, fluorescene, perylene 083, perylene 240, perylene 300 and naphthalimide 570. The selection of particular fluorescent material may depend upon a number of factors, including the wavelength of light being transmitted, the gain desired, the type of antenna employed, etc. The fluorescent material may take the form of a solid in solution, or in suspension, in a liquid material, contained in a transparent housing.

The rod 16 is provided with a coating 20 which extends over the cylindrical surface and the end surface 22. The coating 20 is formed of a material which acts as a high-pass filter, that is, material which transmits light having a frequency equal to or higher than a predetermined frequency, and reflects light having a frequency lower than the predetermined frequency. In other words, the coating 20 is transparent to light having wavelengths equal to or shorter than a predetermined wavelength, and reflects light having a wavelength longer than the predetermined wavelength. Thus, light of such longer wavelengths is reflected internally within the rod 16 to reach the optoelectrical demodulator 14.

It should be understood that the predetermined wavelength for the material of the rod 16 is chosen to be the same as the predetermined wavelength for the material of the coating 20.

The optoelectrical demodulator 14 is connected to a voltage supply terminal 30 and, via a resistor 32, to ground. The demodulator 14 produces an output signal 34 at an output terminal 36, representing the demodulated optical input signal. The optoelectrical demodulator 14 may include a photovoltaic element, a photodiode, or a phototransistor, for example.

When light 40 of wavelength "a" from a light transmitter penetrates the rod 16, it strikes a fluorescent particle 18 which emits light 42 of wavelength "e". The light 42 is reflected internally from the surface of the rod 16 and ultimately passes through an uncoated surface 44 where it impinges on the optoelectrical demodulator 14 which is in close-coupled relationship to said uncoated end surface 44. If desired, both ends of the rod 16 could be left uncoated and an optoelectrical demodulator could be placed in operative relation to each.

Figure 2:
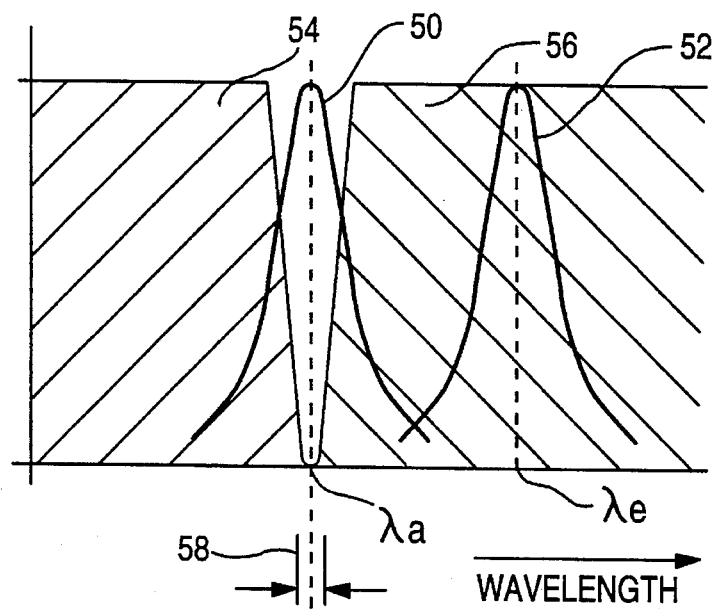
FIG. 2 is a graph showing absorption and emission plotted against wavelength.

Referring now to FIG. 2, the curve 50 represents the absorption of light by the fluorescent material in the rod 16. This is seen to be at a maximum at wavelength "a". The curve 52 represents the emission of light by the fluorescent material. This is seen to be at a maximum at wavelength "e" which has a greater value than wavelength "a". The shaded area 54 represents the absorption of light by the filter material of the rod 16. It is seen that substantially all light is absorbed for wavelengths shorter than about the wavelength "a", whereas the filter material of the rod 16 is transparent to light having a wavelength equal to or longer than "a".

The shaded area 56 represents the reflection of light by the coating 20 of the rod 16. It is seen that light having a wavelength longer than about "a" is reflected, whereas the coating 20 is transparent to light having a wavelength equal to or shorter than wavelength "a". Thus, for a narrow wavelength band 58, centered around wavelength "a", both the material of the rod 16 and the material of the coating 20 are substantially transparent. Accordingly, the light antenna 12 acts as a narrow-pass band filter, centered on wavelength "a".

Referring now to FIG. 3, there is shown an arrangement which employs two optical receivers 70 and 90, each similar to the optical receiver 10 shown in FIG. 1. The optical receiver 70 includes an optical antenna 72 and an optoelectrical demodulator 74, connected between terminals 76 and 78, to provide a demodulated output signal. The optical antenna 72 includes a rod 80 acting as a low-pass filter, being transparent to light having a wavelength equal to or longer than a predetermined wavelength "a1" and absorbing light having a shorter wavelength. The rod 80 is provided with a coating 82 which acts as a high-pass filter, being transparent to light having a wavelength equal to or shorter than the predetermined wavelength "a1", and reflecting light having a longer wavelength. Thus, light having a wavelength within a narrow band centered on the wavelength "a1" can enter the rod 80 and impinge on fluorescent material 84, which responds by emitting light at a wavelength "e1". This light emitted by the fluorescent material 84 is directed along the rod 80 to impinge on the optical demodulator 74 which responds by producing an electrical signal on the output terminal 78.

In a similar manner, the optical receiver 90 includes an optical antenna 92 and an optoelectrical demodulator 94, connected between terminals 96 and 98 to provide a demodulated output signal. The optical antenna 92 includes a rod 100 acting a as low-pass filter, being transparent to light having a wavelength equal to or longer than a predetermined wavelength "a2" and absorbing light having a shorter wavelength. The rod 100 is provided with coating 102 which acts as a high-pass filter, being transparent to light having a wavelength equal to or shorter than the predetermined wavelength "a2", and reflecting light having a longer wavelength. Thus, light within a narrow band centered on the wavelength "a2" can enter the rod 100 and impinge on a particle of fluorescent material 104, which responds by emitting light at a wavelength "e2". This light emitted by the fluorescent material 104 is directed along the rod 100 to impinge on the optoelectrical demodulator 94, which responds by producing an electrical signal on the output terminal 98.

In the operation of the arrangement shown in FIG. 3, it will be appreciated that optical transmitters 110 and 112, emitting modulated light at wavelengths "a1" and "a2", respectively, can transmit simultaneously, with each transmitted signal being received and demodulated by its respective antenna 70, 90 without interference from the other transmitted signal even if the wavelengths "a1" and "a2" are quite close together.

Referring now to FIGS. 4, 5 and 6, there are shown three additional embodiments of an optical receiver constructed in accordance with the present invention. In these embodiments, the low-pass filter material is tubular or hollow in configuration and contains fluorescent material, as previously described, which may be in the form of embedded particles, or may be otherwise suspended in the matrix. The tubular or hollow configuration of these embodiments may be air filled, or may be filled with a solid or liquid material. The external surfaces of the antennas of these embodiments are all coated with a high-pass filter material. The different shapes may provide different directional characteristics and different gain values.

Referring now specifically to FIG. 4, the optical receiver 108 includes an antenna 110 which has a body 112 of generally tubular configuration and a closed top 114, with a necked-down lower end 116. The overall configuration may be considered to have a bottle-like shape. The light emitted from fluorescent particles in the bottle walls is internally reflected as previously described, to ultimately be directed, out of the lower open end 116, to impinge upon an optoelectrical demodulator 118 to cause an electrical data signal to be generated which is sensed across the terminals 120 and 122.

FIG. 5 shows an optical receiver 132 having an antenna 134, and an optoelectrical demodulator 136. This embodiment is similar to the embodiment of FIG. 4, except that the antenna 134 has a spherical or bulb-like shape.

FIG. 6 shows a further embodiment of an optical receiver 140 having an antenna 142 and an optoelectrical demodulator 144. The antenna of this embodiment resembles a hollow rod in shape, having one rounded closed end with the other end having a reduced diameter opening.

FIG. 7 shows the use of a reflector 150 used in connection with an optical antenna 152 to concentrate light transmitted from a transmitter to provide additional gain. The reflector 150 is shown as mounted on a stand 154, and the antenna 152 is connected to the reflector 150 by brackets 156. Other reflectors could likewise be used with other embodiments of the light antennas.

In all the above-described embodiments, the outputs of the optical receivers, such as the terminals 30 and 36 in FIG. 1, can be implemented as a unitary device and connected to further circuitry by conventional connecting means, such as solderable terminals, two-pin plugs, screw-type connectors, jack plugs, etc. Alternatively, the optoelectrical demodulator, such as the optoelectrical demodulator 14, FIG. 1, can be mounted on a printed circuit board, and the antenna, such as the antenna 12, provided as a separate component and mounted so as to make close physical contact with the optoelectrical demodulator mounted on the circuit board. These two implementations will now be described in more detail, with reference to FIGS. 8 and 9.

Referring to FIG. 8, there is shown an implementation of an optical receiver 160 according to the invention embodied as an integral unit including a rod 162 within which a photodiode 164 is located. The photodiode is electrically connected to external terminals 166, 168, which are solderable terminals, adapted to be soldered to terminals (not shown) connecting to further electrical circuitry. Instead of solderable terminals, electrical connections could be made to the optical receiver 160 by other types of connection, such as a two-pin plug connection, a jack plug connection or a threaded screw type connection of the type commonly used for threaded screw electric light bulbs.

Referring to FIG. 9, there is shown an implementation of an optical receiver 180 according to the invention as a two-part device including a rod 182 and a photodiode circuit 184. The rod 182 is provided with a threaded sleeve 186 which is adapted to mate with an internally threaded hole 188 in the wall 190 of a cabinet (not shown). The photodiode unit 184 is mounted in a printed circuit board 192. Instead of providing an internally threaded hole 188, a support unit having a threaded sleeve may be mounted on the cabinet, the threaded sleeve cooperating with a threaded annular cap mounted on the antenna rod.

It will be appreciated that both the antenna rod 162 of FIG. 8 and the antenna rod 182 of FIG. 9 are formed, as described hereinabove, of a low-pass light filter material coated with a high-pass light filter material to provide a narrow band-pass filter unit. Since both antenna rods are of a simple, circuitry construction, they are easy to mount in desired locations by means of the simple connecting arrangements such as those described with reference to FIGS. 8 and 9.

In view of the narrow-pass band filter characteristics it will be appreciated that the described optical receiver can respond only to a single channel, that is, the wavelength of the transmitted light. However, it should be understood that if this wavelength is used as a carrier for a plurality of subcarriers, each carrying different information, then multichannel operation can be achieved. The subcarriers are then separated electrically, rather than optically.

Thus, there have been described several embodiments of an optical receiver which has a high gain, because of the relatively large light collecting area of the antenna rod, yet is of simple construction. The optical receiver acts as a narrow-pass band light filter. This advantageously provides a high signal-to-noise ratio. In particular, where multiple optical receivers are utilized, as in the multichannel embodiment described with reference to FIG. 3, the antennas for each channel can be constructed to receive light of wavelengths which are quite close together, because of the narrow-pass band characteristics. Thus, it is seen that a large number of optical frequency channels are available for data transmission. Also, the antenna has high efficiency because the emitted fluorescent light is reflected towards the optoelectrical demodulator, it being appreciated that the emitted fluorescent light has a longer wavelength (lower frequency) than the received light and can thus travel through the low-pass filter material of the rod and be reflected by the high-pass filter material of the coating. In this connection, it will be appreciated that higher efficiency is achieved since the high-pass material coating is effective to reflect all light internally to the optoelectrical demodulator, whereas without such coating, only light rays within the angle of total internal reflection would be so reflected. Another advantage is that there is no undesired retransmission of signals leaving the antenna rod on a different wavelength, resulting from the "shielding" effect of the high-pass material coating. This avoids the problem of undesired interference with other transmission channels which may be concurrently utilized. Finally, because the antenna rod is implemented as a unitary structure, a low cost is achieved since no additional parts are needed.

What is claimed is:

1. An optical receiver for modulated light, comprising:

an optical antenna for collecting transmitted modulated light and having a fluorescent material dispersed therein, said optical antenna being formed of a low-pass filter material which is transparent to wavelengths equal to or longer than a predetermined wavelength and absorptive to wavelengths shorter than said predetermined wavelength, said optical antenna being provided with a coating of high-pass filter material which is transparent to wavelengths equal to or shorter than said predetermined wavelength, and is reflective to wavelengths longer than said predetermined wavelength, said fluorescent material responding to light of said predetermined wavelength by emitting light of a different wavelength; and an optoelectrical demodulator located in operative relationship to said optical antenna and adapted to convert light emitted by said fluorescent material to electrical signals.

2. The optical receiver of claim 1, in which said coating extends over the entire surface of said optical antenna except for an output surface which is adjacent said optoelectrical demodulator.

3. The optical receiver of claim 1, in which said optical antenna is in the shape of a rod and said optoelectrical demodulator is located at an end of said rod.

4. The optical receiver of claim 2, in which said optical antenna is in the shape of a rod and said optoelectrical demodulator is located at an end of said rod.

5. The optical receiver of claim 3, also including a further optoelectrical demodulator located at another end of said rod.

6. The optical receiver of claim 2, in which said optical antenna is of a hollow construction, with said low-pass filter material forming a wall structure.

7. The optical receiver of claim 6, in which said optical antenna is of a generally bottle-shaped configuration having a relatively large cylindrical body portion which terminates in a relatively small neck portion having said output surface at the end thereof.

8. The optical receiver of claim 6, characterized in that said optical antenna is of a generally spherical configuration, and in which said output surface is of circular configuration having a diameter substantially less than the diameter of the spherical configuration.

9. The optical receiver of claim 6, in which said optical antenna is of a generally tubular configuration having a reduced diameter end including said output surface.

10. The optical receiver of claim 1, in which optoelectrical demodulator is formed integrally with said optical antenna.

11. The optical receiver of claim 1, in which said optoelectrical demodulator and said optical antenna are formed as separate units, and also including attachment means, adapted to locate said optoelectrical demodulator and said optical antenna in cooperative relationship.

12. The optical receiver of claim 1, in which the light emitted by said fluorescent material has a longer wavelength than said predetermined wavelength.

\* \* \* \* \*